United States Patent
Landry, Jr. et al.

(10) Patent No.: US 9,710,860 B2
(45) Date of Patent: Jul. 18, 2017

(54) METHOD AND SYSTEM FOR RECONCILING DATA FROM MULTIPLE SOURCES

(71) Applicant: Electra Information Systems, Inc., New York, NY (US)

(72) Inventors: John P. Landry, Jr., New York, NY (US); Todd J. Sloan, Stroudsburg, PA (US); Lawrence W. Smith, Durham, NC (US); Jeffrey M. Alpher, Washington, DC (US)

( * ) Notice: Subject to any disclaimer, the term of this patent is extended or adjusted under 35 U.S.C. 154(b) by 0 days.

(21) Appl. No.: 14/100,795

(22) Filed: Dec. 9, 2013

(65) Prior Publication Data

US 2014/0164194 A1 Jun. 12, 2014

Related U.S. Application Data

(60) Provisional application No. 61/734,808, filed on Dec. 7, 2012.

(51) Int. Cl.
 *G06Q 40/00* (2012.01)
 *G06Q 10/10* (2012.01)

(52) U.S. Cl.
 CPC ............ *G06Q 40/12* (2013.12); *G06Q 10/10* (2013.01)

(58) Field of Classification Search
 CPC .......... G06Q 40/10; G06Q 40/00; G06F 7/00; G06F 17/24
 USPC .................................... 705/30, 247; 707/812
 See application file for complete search history.

(56) References Cited

U.S. PATENT DOCUMENTS

| | | | | |
|---|---|---|---|---|
| 6,131,087 A * | 10/2000 | Luke | ...................... | G06Q 30/06 705/26.41 |
| 7,451,103 B1 * | 11/2008 | Boyle et al. | .................... | 705/35 |
| 8,055,575 B2 * | 11/2011 | Grody | .................... | G06Q 40/00 705/37 |
| 8,175,943 B1 * | 5/2012 | Pathak | ................. | G06Q 10/087 705/1.1 |
| 8,521,634 B1 * | 8/2013 | Pathak | ................. | G06Q 10/087 235/431 |
| 2002/0026416 A1 * | 2/2002 | Provinse | ................ | G06Q 10/02 705/39 |
| 2002/0032642 A1 * | 3/2002 | Chichilnisky | .................... | 705/37 |
| 2003/0101143 A1 * | 5/2003 | Montgomery | ... | G07B 17/00435 705/62 |
| 2003/0204456 A1 * | 10/2003 | Engdahl | ................ | G06Q 20/00 705/30 |
| 2005/0024510 A1 * | 2/2005 | Lapstun | ................ | H04N 5/378 348/294 |

(Continued)

*Primary Examiner* — Seye Iwarere
(74) *Attorney, Agent, or Firm* — Antonio Papageorgiou; Meister Seelig & Fein LLP

(57) ABSTRACT

A method and system for reconciling data, the method comprising receiving account data including records of holdings, transactions and cash balances of an manager and a custodian. The account data is matched based on a set of rules for matching custodian and manager data. A holding matching process, transaction matching process, and cash matching process are provided to identify matches and exceptions in the records of the holdings, transactions and cash balances from the account data, which may be displayed to an end-user. The method further comprises receiving a request to investigate the exceptions in the records and providing at least one of cash, holding, and transaction investigations of the exceptions in the records.

18 Claims, 10 Drawing Sheets

(56) References Cited

U.S. PATENT DOCUMENTS

| | | | | |
|---|---|---|---|---|
| 2006/0117253 A1* | 6/2006 | Polash | ............ | G06F 17/211 |
| | | | | 715/247 |
| 2007/0005465 A1* | 1/2007 | Kandravy | ............ | G06Q 40/02 |
| | | | | 705/35 |
| 2007/0239577 A1* | 10/2007 | Grody et al. | ............ | 705/35 |
| 2008/0021822 A1* | 1/2008 | Hinton | ............ | G06Q 10/10 |
| | | | | 705/40 |
| 2009/0138387 A1* | 5/2009 | Boyle et al. | ............ | 705/30 |
| 2011/0071958 A1* | 3/2011 | Grody | ............ | G06Q 40/00 |
| | | | | 705/36 R |
| 2012/0011054 A1* | 1/2012 | Grody | ............ | G06Q 40/00 |
| | | | | 705/37 |
| 2012/0323747 A1* | 12/2012 | Kantikovit | ............ | G06Q 20/10 |
| | | | | 705/30 |
| 2013/0103725 A1* | 4/2013 | Wee | ............ | G06F 17/30315 |
| | | | | 707/812 |

* cited by examiner

| Cash Balances | | | | | | |
|---|---|---|---|---|---|---|
| Account | Date | Currency | Date Basis | Manager Closing Balance | Custodian Closing Balance | Balance Difference |
| 12345 | 2012-06-15 | USD | T | 100 | 900 | -800 |
| ABCDE | 2012-06-15 | USD | T | 300 | 300 | 0 |
| ABCDE | 2012-06-15 | GBP | T | 200 | 300 | 100 |

| Holding List | | | | | | | |
|---|---|---|---|---|---|---|---|
| Status | Entity | Account | Date | Security | Quantity | Price | Market Value |
| Near Match | Manager Bank | 12345 | 2012-06-15 | 7SPR 7SPR | 100 95 | 160 160 | 16,000 15,200 |

1020, 1029, 1030, 1021, 1022, 1023, 1024, 1025, 1026, 1027

| Transaction List | | | | | | | | |
|---|---|---|---|---|---|---|---|---|
| Status | Entity | Account | Date | Security | Quantity | Price | Net Amount | Type |
| Single | Bank | 12345 | 2012-06-15 | 7SPR | 5 | 160 | 800 | Sell |

METHOD AND SYSTEM FOR RECONCILING DATA FROM MULTIPLE SOURCES

CLAIM OF PRIORITY

The present application claims the benefit of U.S. Provisional Application No. 61/734,808, filed on Dec. 7, 2012 and entitled "METHOD AND SYSTEM FOR RECONCILING DATA FROM MULTIPLE SOURCES," the disclosure of which is hereby incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present application relates to data processing systems and more particularly systems for the reconciliation of data from multiple sources.

DESCRIPTION OF THE RELATED ART

Account reconciliation is a process for reconciling discrepancies that exist between amounts recorded in a given account and the original transaction amounts on which the account records are based. One common form of account reconciliation is found in the area of personal finance. For example, an individual may reconcile his/her personal checkbook with the monthly statement received from the bank. The individual examines the check stub or copy of the actual check as written against the bank statement for any differences. When a discrepancy is found, the individual can contact the bank to resolve or reconcile the difference.

While account reconciliation might appear rather basic in the context of personal finance, the practice becomes more involved when applied to funds and holdings of institutional investors, high net worth individuals, etc. Investment managers or fund managers, who represent, for example, institutional investors, must have records that agree with the records maintained by the custodians of the institutions' investment assets, such as the institutional investors' banks. For example, a fund manager buys and sells securities on behalf of an investor or client, and those securities are safe-kept with custodians. The fund manager and the custodian each maintain their own books and records; the securities, cash balances and transactions among those different books and records must be regularly and periodically reconciled.

Typically, the process of reconciling the different records is a procedure which is performed by the fund manager. For example, the fund manager receives statements from the custodian, and the fund manager generally deals with many different custodians. The fund manager may perform a visual scan, such as noting one hundred (100) shares of a stock on the fund manager's record and one hundred shares of the same stock on the custodian's record. The process continues in the same way, for example, for each position, transaction and cash item for a given client until completed. Such a process is extremely tedious, time consuming and error prone. Accordingly, there is a need for improved account reconciliation processes.

SUMMARY OF THE INVENTION

The present invention provides methods, systems and computer readable media for reconciling data. The method according to one embodiment comprises receiving account data including records of holdings, transactions and cash balances of an manager and a custodian. The account data is matched based on a set of rules for matching custodian and manager data. A holding matching process, transaction matching process, and cash matching process are provided to identify matches and exceptions in the records of the holdings, transactions and cash balances from the account data, which may be displayed to an end-user. The method further comprises receiving a request to view, review or otherwise investigate the exceptions in the records and providing at least one of cash, holding, and transaction investigations of the exceptions in the records.

The exceptions in the records may include singletons and near matches. According to one embodiment, a singleton transaction (neither a match nor a near match) is displayed in a single row, whereas a near match transaction is displayed in a single row that includes a manager transaction sub-row and a custodian transaction sub-row. Similarly, a singleton holding may be displayed in a single row and a near match holding is displayed in a single row including a manager holding sub-row and a custodian holding sub-row.

According to one embodiment, the method further comprises receiving a selection for cash investigation, retrieving cash balances from the account data, receiving a selection of a given cash balance to examine, loading transaction exceptions from the records of the manager and the custodian, receiving a selection of a given transaction exception, loading holdings corresponding to the transaction exception, and identifying one or more holding exceptions from the loaded holding exceptions that are being caused by the transaction exception. With regard to cash balances, retrieving cash balances from the account data may include providing a list of one or more cash balances for one or more accounts. Furthermore, displaying the list of one or more cash balances may include displaying for each account a date, currency, balance date basis (e.g., trade or settle date), manager closing balance, custodian closing balance, and balance difference.

In one embodiment, loading transaction exceptions may include retrieving singleton transactions and near match transactions using account number, date, currency, balance date basis or other identifying data. Loading the transaction exceptions may also include displaying for each transaction a variety of information, such as status, a data source, e.g., entity, account, date, security identifier, quantity, price, and net amount. In another embodiment, loading holdings corresponding to the transaction exception includes retrieving singleton holdings and near match holdings using account number, date, currency or other identifying data. Loading holdings corresponding to the transaction exception may also include displaying for each holding a variety of information, such as status, a data source, account, date, security identifier, quantity, price, and market value.

The method may further comprise receiving a selection for transaction investigation, retrieving transaction exceptions from the account data, receiving a selection of a given transaction exception to examine, loading holding exceptions from the records of the manager and the custodian associated with the given transaction, and identifying a specific holding exception from the loaded holding exceptions that is being caused by the transaction exception. In another embodiment, the method may further comprise receiving a selection for holding investigation, retrieving holding exceptions from the account data, receiving a selection of a given holding exception to examine, loading transaction exceptions from the records of the manager and the custodian associated with the given holding exception, and identifying a specific transaction exception from the loaded transaction exceptions that is causing the holding exception.

A system for reconciling data comprises a processor and a memory having executable instructions stored thereon that when executed by the processor cause the processor to receive account data including records of holdings, transactions and cash balances of an manager and a custodian. The processor is configured to match the account data based on a set of rules for matching custodian and manager data and provide a holding matching process, transaction matching process, and cash matching process to identify matches and exceptions in the records of the holdings, transactions and cash balances from the account data. The processor is also configured to receive a request to investigate the exceptions in the records, and provide at least one of cash, holding, and transaction investigations of the exceptions in the records.

In one embodiment, the processor may be further configured to receive a selection for cash investigation, retrieve cash balances from the account data, receive a selection of a given cash balance to examine, load transaction exceptions from the records of the manager and the custodian, receive a selection of a given transaction exception, load holdings corresponding to the transaction exception and identify one or more holding exceptions from the loaded holding exceptions that are being caused by the transaction exception. In another embodiment, the processor may be further configured to receive a selection for a transaction investigation, retrieve transaction exceptions from the account data, receive a selection of a given transaction exception to examine, load holding exceptions from the records of the manager and the custodian associated with the given transaction, and identify a specific holding exception from the loaded holding exceptions that is being caused by the transaction exception. In yet another embodiment, the processor may be further configured to receive a selection for a holding investigation, retrieve holding exceptions from the account data, receive a selection of a given holding exception to examine, load transaction exceptions from the records of the manager and the custodian associated with the given holding exception, and identify a specific transaction exception from the loaded transaction exceptions that is causing the holding exception.

Still other embodiments of the invention are directed towards computer readable media comprising program code that when executed by a programmable processor causes execution of a method for reconciling data. The computer readable media comprises computer program code for receiving account data including records of holdings, transactions and cash balances of an manager and a custodian, computer program code for matching the account data based on a set of rules for matching custodian and manager data, computer program code for providing a holding matching process, transaction matching process, and cash matching process to identify matches and exceptions in the records of the holdings, transactions and cash balances from the account data, computer program code for receiving a request to investigate the exceptions in the records, and computer program code for providing at least one of cash, holding, and transaction investigations of the exceptions in the records.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 10 illustrates exemplary holding and transaction windows according to another embodiment of the present invention.

DETAILED DESCRIPTION OF THE EMBODIMENTS

The processes discussed herein are generally performed by or using at least one computer device, preferably coupled to at least one other computer device over a communication network. For example, at least one computer may be a server computer coupled to one or more client computers, such as a custodian computer(s), a manager computer(s), etc. The client-side computers may themselves be server computers, or terminal computers, such as personal computers, laptop computers, tablets, smart phones, etc.

Figure 1:
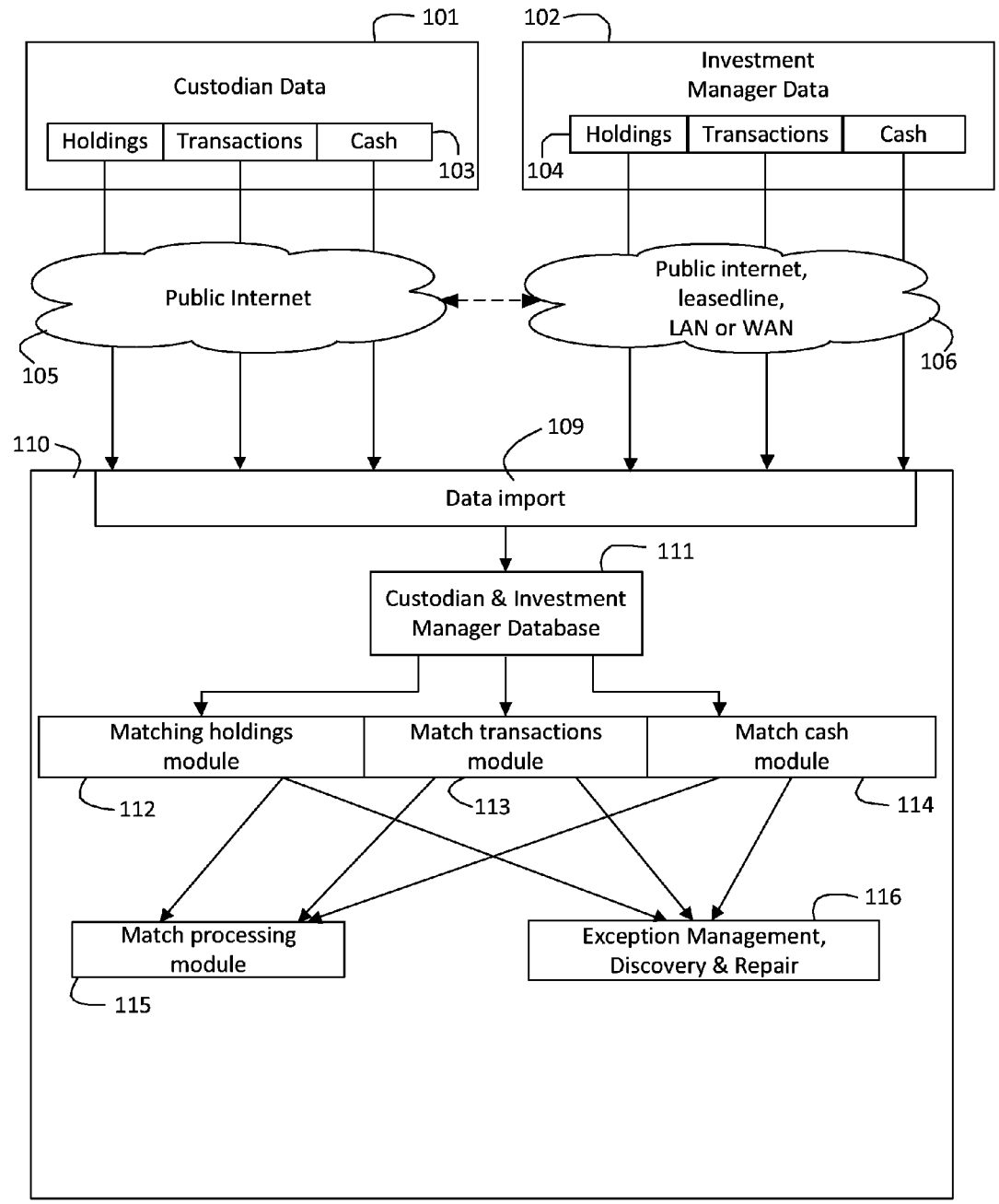
FIG. 1 illustrates a computing system according to an embodiment of the present invention.

Turning to FIG. 1, a custodian and a manager in one embodiment keep independent internal records of holdings, transactions and cash balances, which are included in account data 103 and 104. The manager generally trades on behalf of a client (e.g., investor or account owner) and may maintain trading data, for example, as manager data 104, as shown. Cash gained or used in the process of trading is maintained by the custodian, for example, as custodian data 103 in the custodian data store 101. The custodian may also keep its own records on the basis of activity conducted with the trading broker. On a daily basis, which can be less or more frequent by mutual agreement between the custodian and manager, the custodian may export its account data 103 for all accounts managed by the manager, transmitting the account data 103 to the manager at reconciliation system 110 via a communication network 105.

The transmission of account data 103 and account data 104 via a communication network may be made over a public network such as the Internet 105 and may utilize one or more data formats, which include delimited, proprietary, SWIFT, etc. Various protocols may be used to transfer data, including, e.g., FTP, SFTP, etc., and encryption, e.g., PGP, GPG, etc., may be utilized on the transmission link. It should be noted that both the custodian and manager may communicate with the reconciliation system 110 by means of one or more networks 105 and 106, including various combinations of public and private networks, as well as take advantage of interconnections between the two.

In a similar fashion to the technique employed by the custodian, a manager may export account data 104 held in its data store(s) 102, which may include holdings, transactions, and cash, sending the data via a communication network, such as the Internet 105 (if the reconciliation system 110 is hosted) or a private network 106, to reconciliation system 110. The custodian data 101 and manager data 102 are duly imported, extracted or otherwise received by an import component 109 and stored in a database 111 that the reconciliation system 110 maintains. Once the custodian data 101 and manager data 102 are imported into the database 111 for storage, one or more matching process modules 112, 113 and 114 may be executed by the reconciliation system 110 using sets of rules for matching custodian and manager data, which may be defined by a given manager. Matching processes may include a holdings matching process, transactions matching process, and cash matching process.

According to various embodiments, multiple sets of user defined criteria may be specified to match bank and manager generated data, with a given set of criteria specified as a "match" or a "near match". There are no limits to the number of sets that can be specified, although upward bounds may be set to maintain manageability of any given set of criteria. Furthermore, in instances where a given item matches based on different sets of criteria, the highest order match level may be assigned, e.g., a "match" versus a "near match". Criteria for matching may include any data made available by the bank and manager, and which is further deemed relevant by the user of the reconciliation system. With regard to holdings and transactions, typical higher order matches include criteria for evaluating security identifiers and quantities. More specifically, holding match criteria may include market value and/or price within some set tolerance, whereas transaction match criteria may include the net amount and price for a given transaction. Furthermore, descriptive information may sometimes be important and may be selected by the user as criteria for evaluation, e.g., security description includes 'OPTION' from the bank and 'OPT' on the manager side. For transactions, match criteria may similarly need to match on long/short or buy/sell indicators. It will be apparent to those of skill in the art that the above-provided criteria are meant to be exemplary, by providing examples of criteria that may be used to determine matches in the reconciliation system, and not intended to be limiting.

At the conclusion of the matching processes performed by modules 112, 113 and 114, a given row of data may be tagged as a singleton, near match or match. Singletons and near matches are collectively known as exceptions and are passed to an exceptions processing module 116 for reconciliation. The matches are tagged and stored by a match processing module 115 and are typically not presented for further review.

Figure 2:
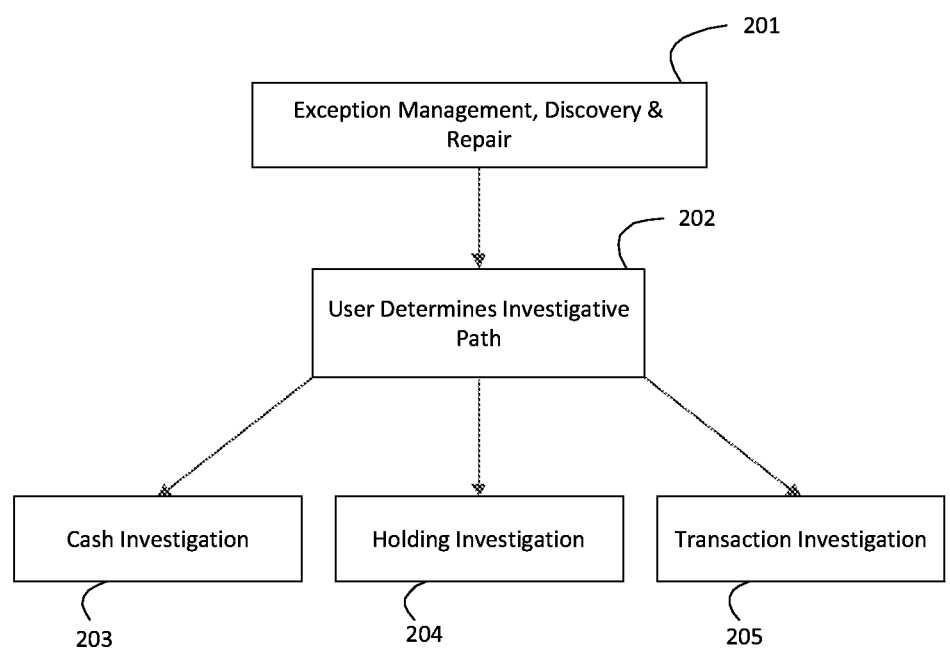
FIG. 2 illustrates at least a portion of a computing system according to another embodiment of the present invention.

Exception management, discovery and repair are the next phases of reconciliation, which may be carried out by the exception processing module 116. Turning to FIG. 2, a user may determine a specific path through which to investigate a given exception 202. According to one embodiment, exception processing begins with the investigation of cash exceptions 203, which is often the best way to begin, but beginning investigations by looking at holdings 204 or transactions 205 are also valid approaches. All three methods are discussed herein in greater detail, beginning with a cash investigation with respect to the description of FIG. 3.

Figure 3:
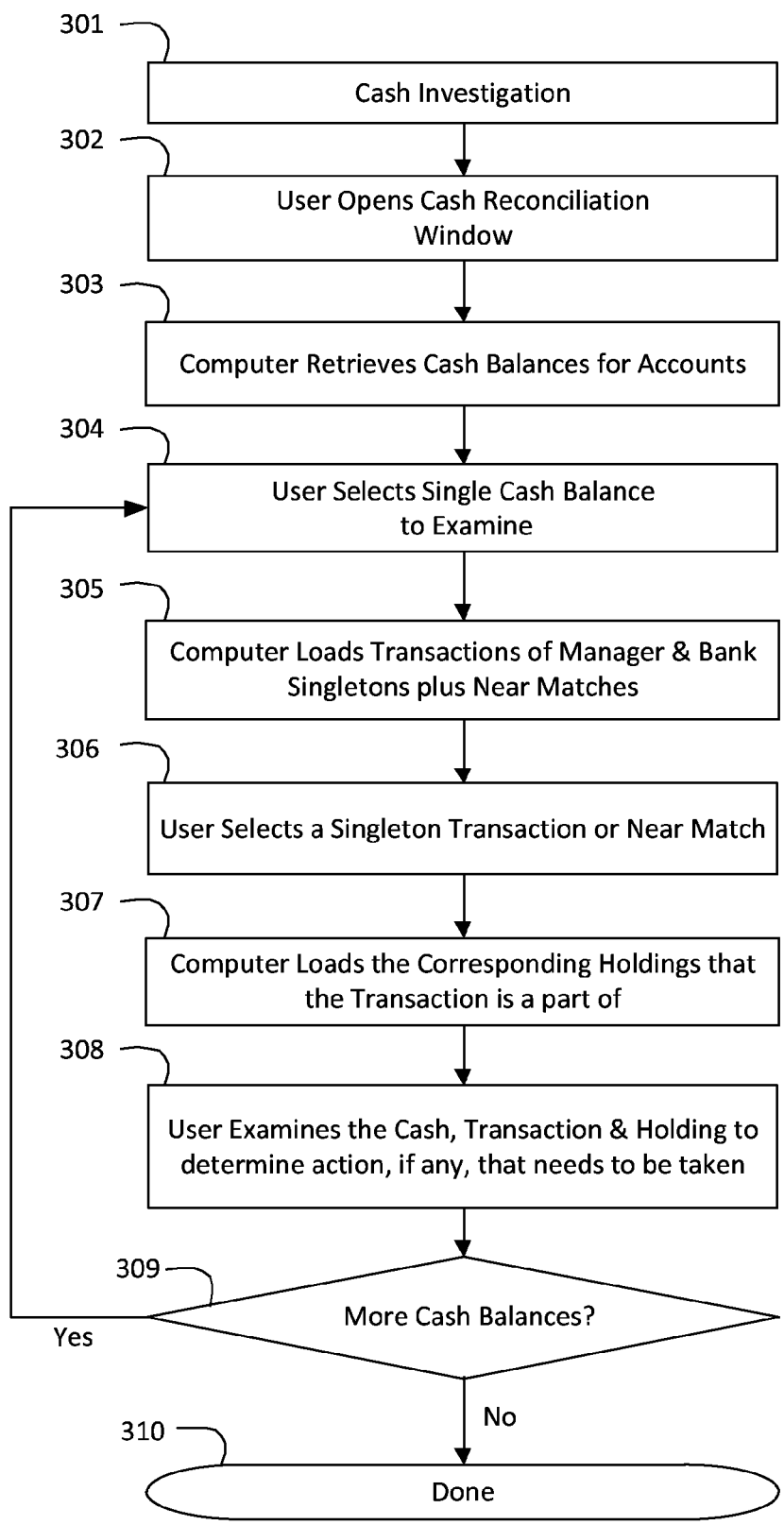
FIG. 3 illustrates a flow diagram of a method for cash investigation according to one embodiment of the present invention.

Referring to FIG. 3, the user accesses a cash reconciliation process, step 302, and may select from a set of user-defined cash search criteria in order for the reconciliation system to retrieve and display cash balances for one or more accounts, step 303. For example, in an exemplary cash interface, exemplary search criteria may include all accounts with currency in USD and that are out of balance by more than a specified amount. The retrieval of cash balances may further include displaying a list of cash balances and may comprise balances of account data for the prior business day. Multiple cash balances may be available for each account, as uniqueness may be defined as account, currency type, closing balance date and balance date basis.

Figures 4A, 4B:
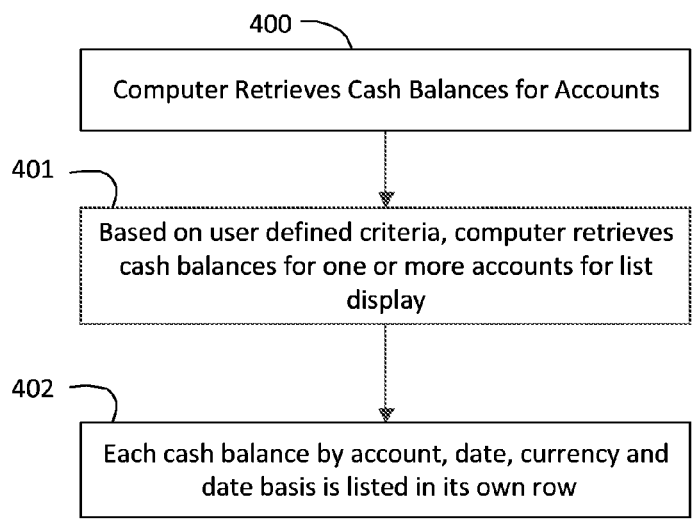
FIG. 4A illustrates a flow diagram of a method for retrieving cash balances according to one embodiment of the present invention.
FIG. 4B illustrates data resulting from retrieving cash balances according to one embodiment of the present invention.

FIG. 4A presents a detailed description of step 303 recited in FIG. 3. Retrieving cash balances for accounts includes the reconciliation system retrieving cash balances 400 for one or more accounts for list display based on user defined criteria, step 401. Exemplary user defined criteria may include, but is not limited to, portfolioID, currency, balance difference, manager balance, bank balance, closing date, etc. On the basis of these user defined criteria, the reconciliation system may display all singletons and near match transactions, which according to one embodiment displays the difference by summing net amounts. Those of skill in the art recognize that there are multiple points of discrepancy that the present reconciliation system may identify and that the above-described scenario represents but one possible case.

Continuing with FIG. 4A, a given cash balance is listed in its own row by account, date, currency and balance date basis (e.g., trade or settle date), step 402. An exemplary cash balance window displaying cash balances of accounts according to step 402 is illustrated in FIG. 4B. In FIG. 4B, the illustrated cash balance 410 window lists cash balances 411 and may also display the manager closing balance 415, custodian closing balance 416 and the balance difference between the two 417.

Returning to FIG. 3, the user may examine the list of cash balances and select a cash balance to examine or investigate, step 304, using, for example, tools or automated functions provided by the system. Selecting a cash balance, step 304, prompts the reconciliation system to load manager and bank transactions that are singletons and near matches, step 305 for the selected cash balance, step 304.

Figures 5A, 5B:
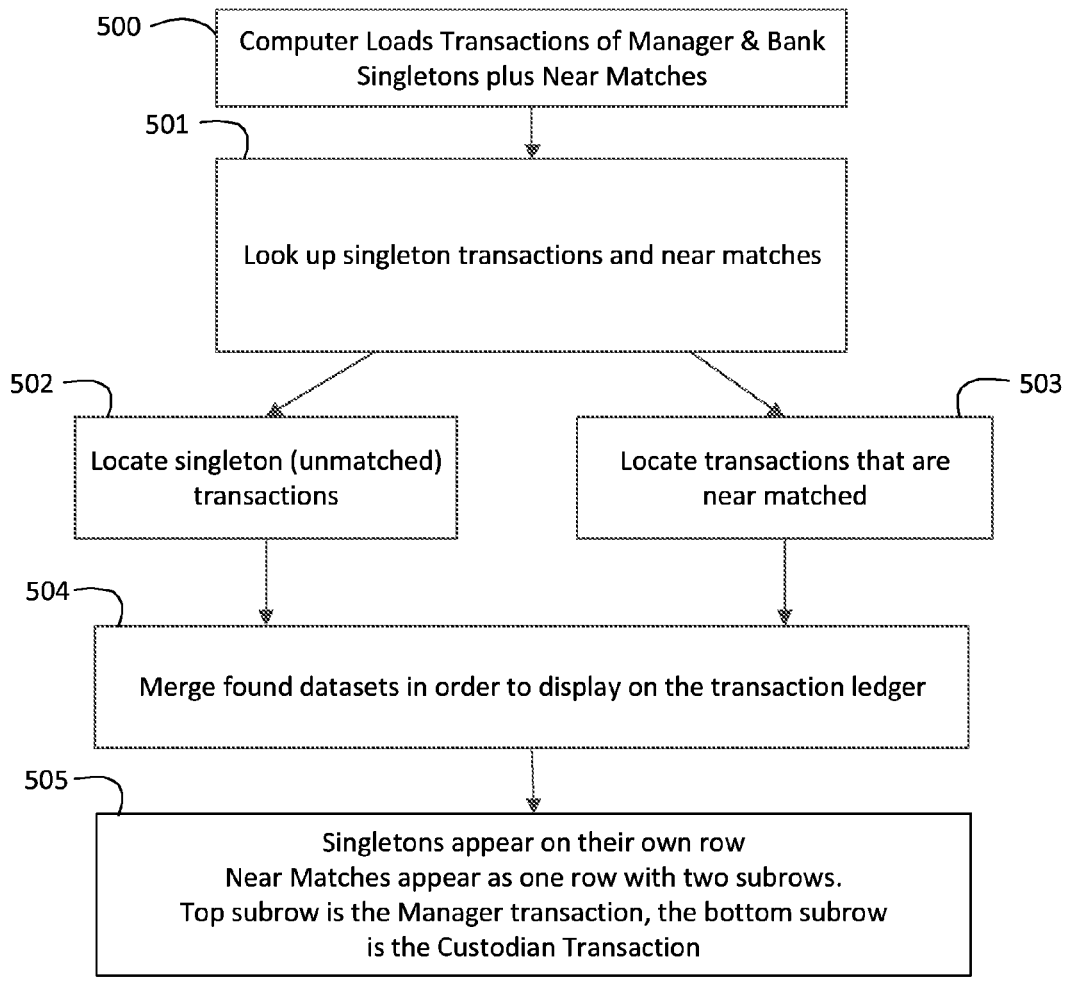
FIG. 5A illustrates flow diagram of a method for retrieving transactions according to one embodiment of the present invention.
FIG. 5B illustrates data resulting from retrieving transactions according to one embodiment of the present invention.

FIG. 5A presents a detailed description of the retrieval and loading of singletons and near matches for a given transaction. The step of loading manager and bank transactions that are singletons and near matches includes the reconciliation system searching for singleton transactions and near matches, step 501, which may comprise using various combinations of account number, date, currency, and balance basis (e.g., trade or settle date) steps 502 and 503. Resulting from the load process, singleton (unmatched) transactions are located, step 502 and transactions that are near matched are also located, step 503. Datasets of the located transactions are merged, step 504, for display on a transaction ledger, step 505.

Transactions for singletons and near matches are displayed, step 505. According to one embodiment, displaying the transactions may include the display of singletons on a single row, whereas display of near matches includes displaying a row with two sub-rows—the top sub-row operative to display the manager transaction and the bottom sub-row operative to display the custodian transaction. An exemplary singleton transaction list 510 is illustrated in FIG. 5B, a given exemplary singleton comprising the status of the singleton 511, entity and account information 512 and 513, the security traded 515, as well as the date 514, quantity 516, price 517 and net amount 518 of the transaction.

Turning back again to FIG. 3, the user examines any exceptions and may choose to investigate further by selecting an exception, step 306, which in turn prompts the reconciliation system load the corresponding holdings of which the transaction is part, step 307. The user may review the cash balances, transactions, and holdings, to determine the next set of actions, step 308. The remedy of exceptions may vary depending on the circumstances. After taking any required action, step 308, the user may elect to continue examining any additional cash balances, step 309, or may exit the cash investigation sub-process that the reconciliation system provides, step 310.

Figures 6A, 6B:
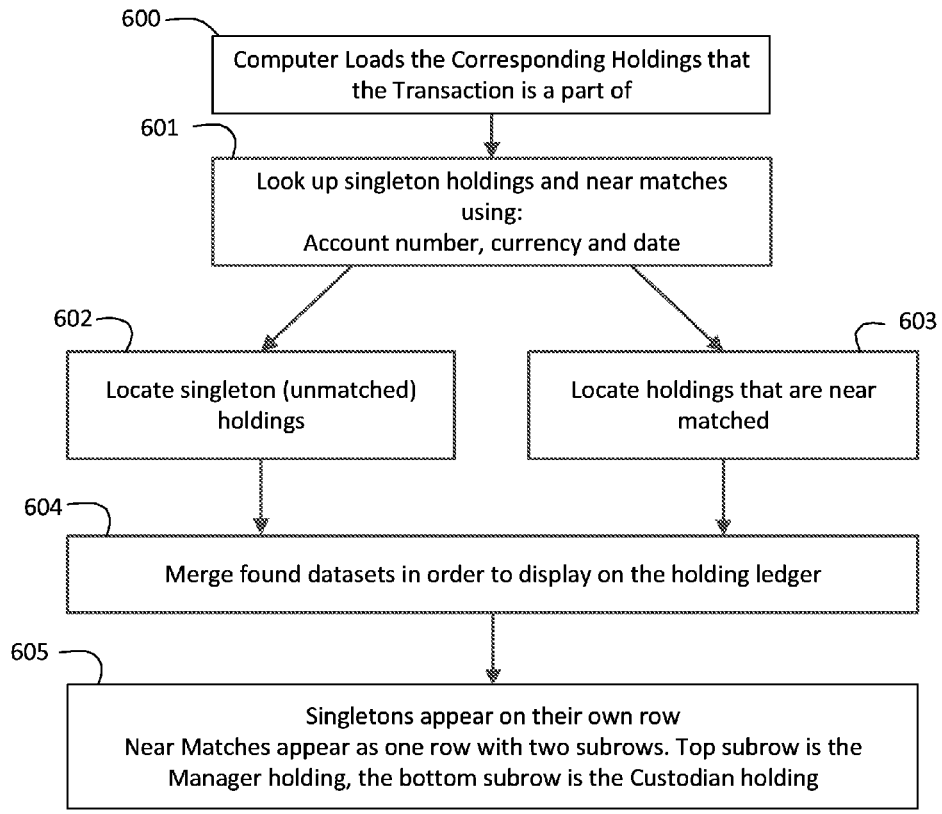
FIG. 6A illustrates flow diagram of a method for retrieving holdings of transactions according to one embodiment of the present invention.
FIG. 6B illustrates data resulting from retrieving holdings of transactions according to one embodiment of the present invention.

FIG. 6A presents a detailed description of loading corresponding holdings of a selected singleton or near match, which includes the reconciliation system searching for singleton holdings and near matches using account number, currency and date, step 601. Singleton holdings are located, step 602, as well as holdings that are near matches, step 603. Datasets of the located holdings are merged for display on a holding ledger, step 604. Singletons and near matches for specific holdings are displayed in an interface that the reconciliation system provides, step 605. According to one embodiment, the display of holdings may include displaying singletons on a single row and displaying near matches includes displaying a row with two sub-rows—a top sub-row operative to display the manager holding and a bottom sub-row operative to display the custodian holding.

FIG. 6B illustrates an exemplary near match holding, which may be generated in accordance with the method of FIG. 6A. According to the present illustration, the reconciliation system locates a list of near match holdings 610, with a single near match 611 displayed as a manager row 604 above a bank row 608 (indicated by the entity 612). According to certain embodiments, the reconciliation system provides simplicity by displaying only a single value where the data is required to be perfectly matched. The interface of FIG. 6B further illustrates that the holding quantity 616 difference is '5' units, which matches that of the transaction quantity difference 516 from FIG. 5B. That is, the manager 604 still holds '100' units and the bank 608 holds '95' units (indicated by the quantity 616), having sold '5' units of the holding. Rows 604 and 608 also indicate the current price 617 and the market value 618 of security 615 in the respective holdings.

Figure 7:
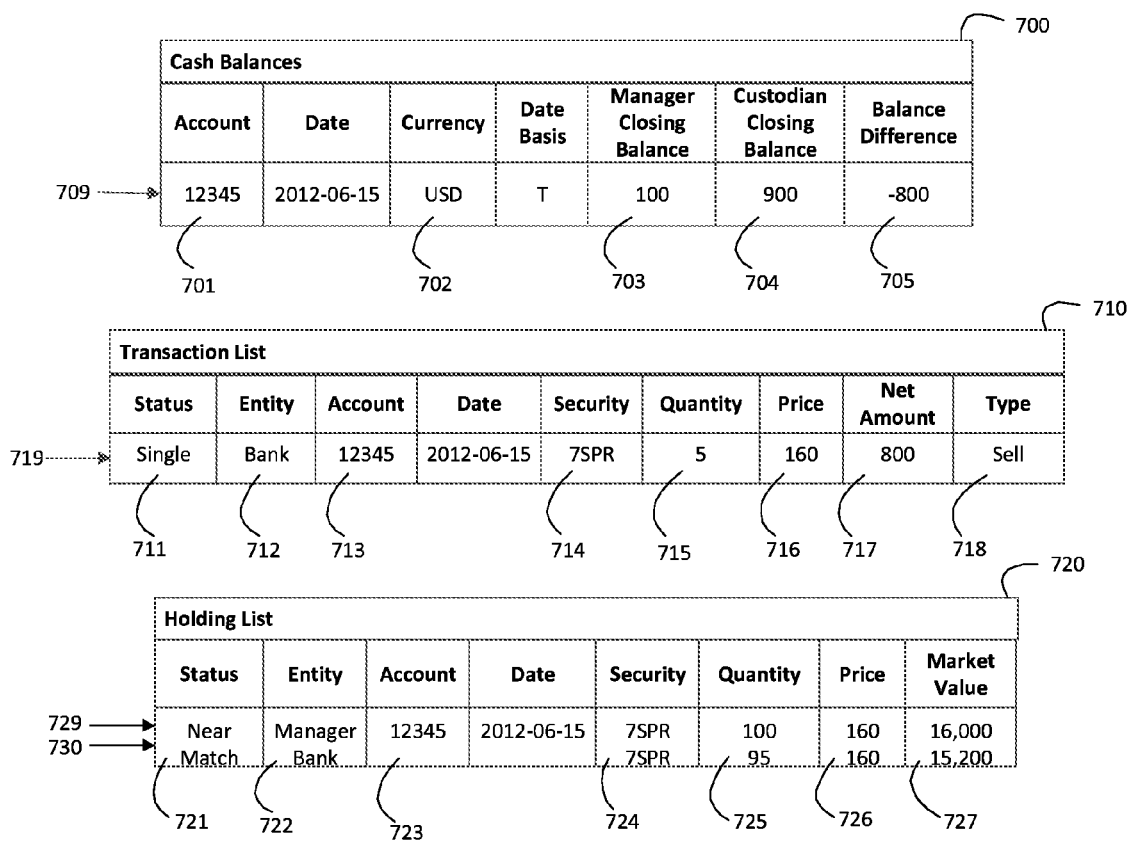
FIG. 7 illustrates exemplary cash, transaction and holding windows according to one embodiment of the present invention.

FIG. 7 presents screen diagrams that represent a use-case illustrating how the reconciliation system of the present invention presents and manipulates multiple values within specific interfaces for cash, transactions and holdings. Those of skill in the art should recognize that the screen diagrams that FIG. 7 illustrates may be presented as a single screen or within a single window, multiple sub-panes or windows within a master container window, or as multiple distinct sub-panes or windows. In the illustrated example, the reconciliation system identifies account number '12345' 701 with the account manager reporting a closing cash balance 703 of '100', which is reported in USD 702. The reconciliation system further identifies that the custodian for the account reports a closing balance 704 for the same account of '900' with a Balance Difference 705 of '−800'. By convention, the custodian closing balance 704 is subtracted from the manager closing balance 703 to arrive at the Balance Difference 705 (100−900=−800).

The selection by the user of cash balance 709 for account number '12345' 701 instructs the reconciliation system to invoke the transaction list 710 for presentation. According to the illustrated transaction row 719, the record represents a singleton 711 from the custodian entity 712. The transaction row 719 further indicates that the transaction type was a sale 718 of a security identified by transaction security identifier '7SPR' 714 with a net amount 717 of '800' (currency not shown). The transaction resulted in the sale of five units 715 at a price 716 of '160' (currency not shown). By comparing the cash balance 705 and the transaction net amount 717, the reconciliation system indicates that the manager is failing to report or otherwise missing the transaction. Further, the system may highlight the net amount 717 of '800'. To verify the analysis, the reconciliation system (or in some embodiments the user) selects the transaction row 719, which instructs the reconciliation system to invoke the holding list 720 for display.

The associated holding is located by the system by searching for holding singletons or near matches with the same security identifier 724 in the holding as the transaction security identifier 714, e.g., the holding that matches the security identifier 714 for the singleton transaction 719 selected from the transaction list 710, in addition to the same account identifier 723 in the holding as well as the transaction 713. According to the present illustration, the reconciliation system locates a near match 721 and displays the manager row 729 above the bank row 730 (indicated by the entity 722). According to certain embodiments, the reconciliation system provides simplicity by displaying only a single value where the data is required to be perfectly matched. Further analysis shows that the transaction quantity 715 difference is '5' units, which matches that of the holding quantity difference 725 and may be highlighted by the reconciliation system. That is, the manager 729 still reports holding '100' units and the bank 730 holds '95' units (indicated by the quantity 725), having sold '5' units of the holding. Rows 729 and 730 also indicate the current price 726 and the market value 727 of security 724 in the respective holdings.

Figure 8:
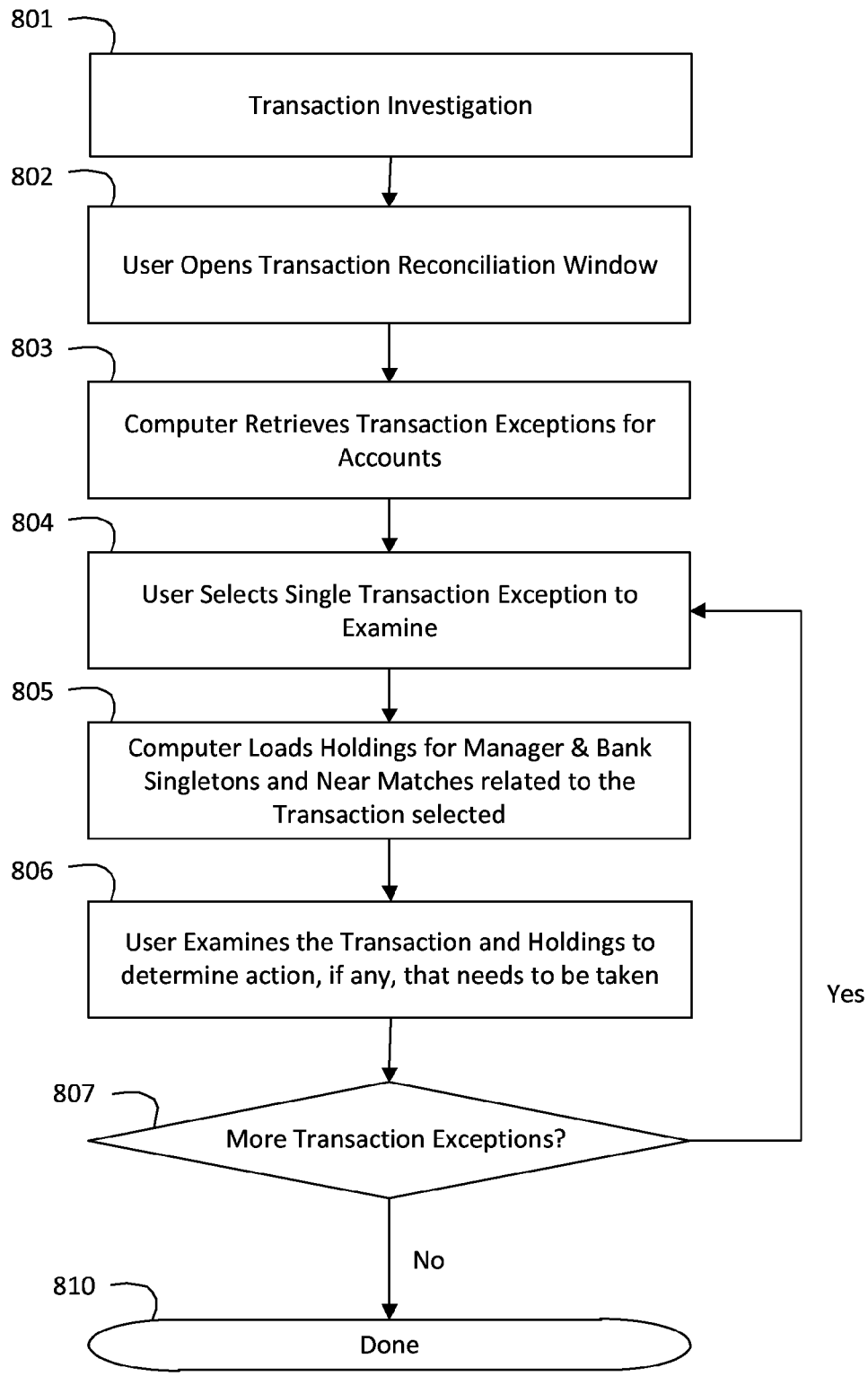
FIG. 8 illustrates flow diagram of a method for transaction investigation according to one embodiment of the present invention.

FIG. 8 presents a flow diagram of a transaction investigation 801. Referring to FIG. 8, the user opens a transaction reconciliation window, step 802, and selects from a set of transaction search criteria in order to display a list of transaction exceptions retrieved by the reconciliation system for one or more accounts, step 803. According to one embodiment, the list of transactions may include the transaction data for the prior business day.

Multiple transaction exceptions may be available for each account. The user examines the list of transactions and selects a transaction exception to examine or investigate, step 804. Selecting a transaction exception prompts the reconciliation system to load manager and custodian holdings that are singletons and near matches relating to the selected transaction, step 805. The user reviews a given selected transaction and related holdings to determine the next set of actions, step 806. The remedy of exceptions may vary depending on the circumstances. For example, remediation of a bank singleton, such as an unexpected bank fee, may comprise exporting the transaction back to the manager accounting system so that the reconciliation system may reconcile the transaction when the data is subsequently received from the manager accounting system. With near matches, however, either the bank or the manager has faulty or otherwise corrupted data, which requires the parties to communicate to determine the appropriate resolution on the basis of the source of corrupt data. Those of skill in the art recognize that the reconciliation system may identify other exceptions beyond those identified above, each of which may require other or different action(s) to be taken to effect remediation of the exception. After taking any required action, step 806, the user may elect to continue examining transactions, step 807, or may exit the transaction investigation window, step 810.

Figure 9:
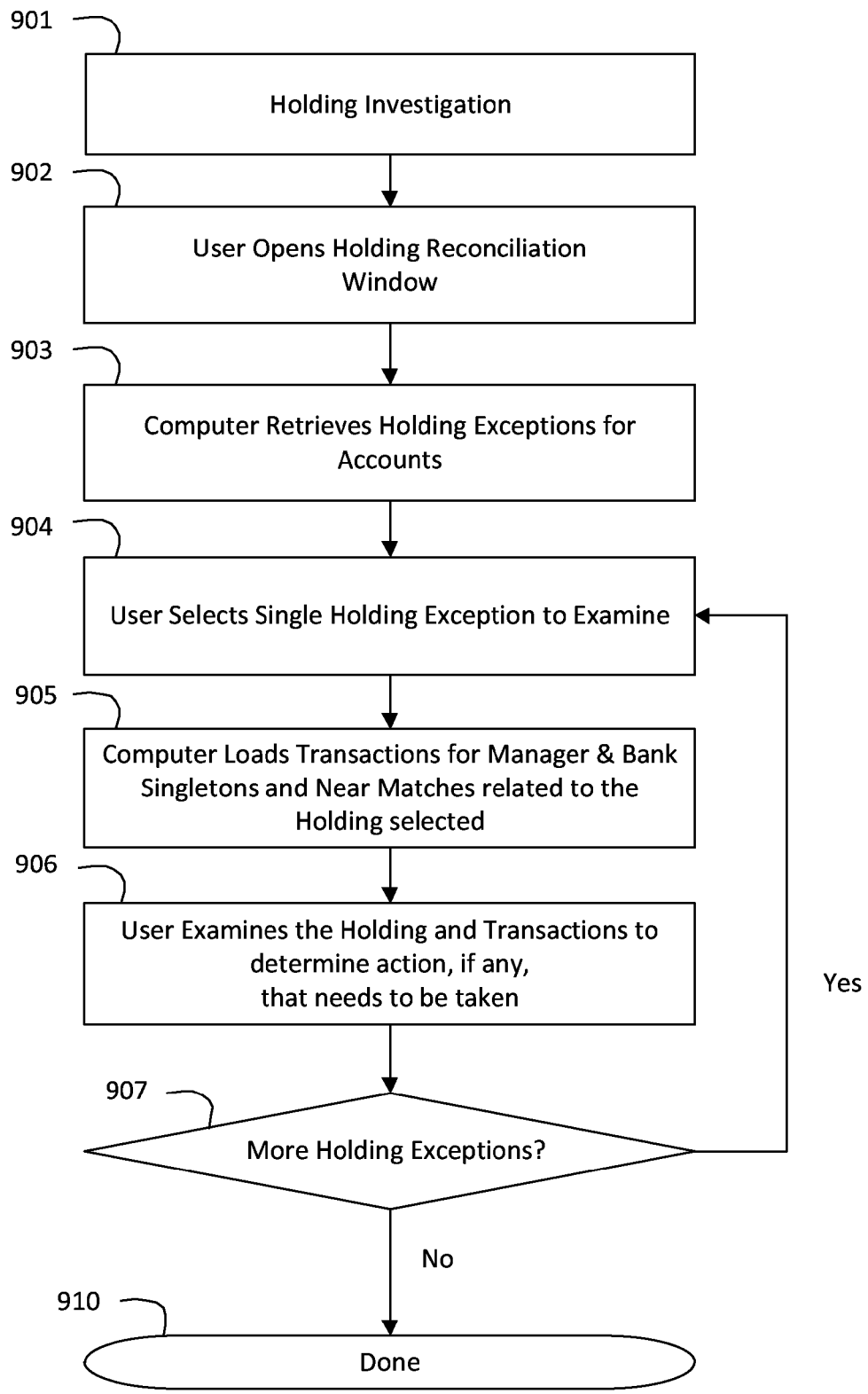
FIG. 9 illustrates a flow diagram of a method for holding investigation according to one embodiment of the present invention.

FIG. 9 presents a flow diagram illustrating the holding investigation process 901. Referring to FIG. 9, the user opens a holding reconciliation window, step 902, and selects from a set of holding search criteria, the selection of which is operative to instruct the reconciliation system to retrieve a list of holding exceptions (singletons and near matches) for one or more accounts, step 903. According to one embodiment, the list of holdings includes the holding data for the prior business day.

Multiple holding exceptions may be available for each account. The user examines the list of holdings, step 903, and selects a holding exception to examine or otherwise investigate, step 904. Selecting a holding exception prompts the reconciliation system to load and display manager and custodian transactions that are singletons and near matches step 905 relating to the selected holding step 904. The user reviews the selected holding and related transactions to determine the next set of actions, step 906. The remedy of exceptions may vary depending on the circumstances. After taking any required action, the user may elect to continue examining holdings, step 907, or may exit the holdings investigation window, step 910.

FIG. 10 presents an example of the holding investigation illustrated in FIG. 9, showing how the values of specific fields interact between holdings and transactions. The holding exception list 1020 has one near match 1021 listed with the manager row 1029 above the bank row 1030 (indicated by the entity 1022) for account '12345' 1023. Rows 1029 and 1030 indicate the current price 1026 and the market value 1027 of security 1024 in the holdings. The selection by the user of this holding 1021 populates the transaction list 1010 with transaction exceptions of account '12345' 1013 related to the selected holding. The transaction list is located by the reconciliation system by searching for transaction singletons or near matches with the same security identifier in the transaction 1014 as the holding security identifier 1024. In this case, the system located a singleton 1011 bank (identified by the entity 1012) transaction 1019 for the sale 1018 of the security at a price 1016 of '160' (currency not identified) in the net amount 1017 of '800' (currency not identified). The near match holding 1021 has a quantity difference 1025 of '5' units. Reviewing the transaction singleton, the quantity 1015 of '5' units verifies the difference between the holdings' quantity 1025. The remedy of exceptions may vary depending on the circumstances.

FIGS. 1 through 10 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments.

What is claimed is:

1. A method for correlating, loading and presenting a plurality of reconciling data in a window display, the method comprising:

receiving, via a processing device, account data including records of holdings, transactions and cash balances of accounts managed by a manager, the account data received by the processing device importing data from a manager database and data from a custodian database over a communications network;

matching, via the processing device, the account data based on a set of one or more rules for matching custodian and manager data, the matching including merging the imported data from the manager database with the imported data from the custodian database;

identifying, via the processing device, matches and exceptions in records of the manager and custodian for holdings, transactions and cash balances from the account data, the exceptions in the records including singletons and near matches, wherein a near match comprises a plurality of at least one of cash balances, transactions, and holdings having at least one set of matching terms and at least one set of non-matching terms;

providing, via the processing device, data for display on a user interface screen the identified matches and exceptions in a master container window;

receiving, via the processing device, a request to investigate the exceptions in the records;

generating, via the processing device responding to the request, a plurality of windows within the master container window, a first of the plurality of windows comprises cash balances, a second of the plurality of windows comprises transactions, and a third of the plurality of windows comprises holdings;

retrieving, via the processing device, the records of cash balances;

loading, via the processing device, the first of the plurality of windows with the records of cash balances;

monitoring, via the processing device, the first of the plurality of windows for a selection of a given cash balance from the first of the plurality of windows;

loading, via the processing device, the second of the plurality of windows with exceptions from the records of transactions associated with the given cash balance in response to the selection of the given cash balance;

monitoring, via the processing device, the second of the plurality of windows for a selection of a given transaction exception from the second of the plurality of windows; and loading, via the processing device, the third of the plurality of windows with near match holdings from the records of cash balances associated with the given transaction exception in response to the selection of the given transaction exception, each of the near match holdings in the listing including a manager holding sub-row and a custodian holding sub-row.

2. The method of claim 1 wherein a singleton transaction is displayed in a single row.

3. The method of claim 1 wherein near match transactions are displayed in a single row including a manager transaction sub-row and a custodian transaction sub-row.

4. The method of claim 1 wherein a singleton holding is displayed in a single row.

5. The method of claim 1 further comprising:
receiving a selection for a cash investigation;
retrieving cash balances from the account data;
receiving a selection of a given cash balance from the account data to examine;
loading transaction exceptions from the records of the manager and the custodian;
identifying a specific transaction exception from the loaded transaction exceptions that is causing the cash exception;
loading holdings corresponding to the specific transaction exception; and
identifying one or more holding exceptions from the loaded holding exceptions that are being caused by the transaction exception.

6. The method of claim 5 wherein retrieving cash balances from the account data includes providing a list of one or more cash balances for one or more accounts.

7. The method of claim 6 wherein displaying the list of one or more cash balances includes displaying for each account a date, currency, balance date basis, manager closing balance, custodian closing balance, and balance difference.

8. The method of claim 5 wherein loading the transaction exceptions includes retrieving singleton transactions and near match transactions using account number, date, currency, and balance date basis.

9. The method of claim 5 wherein loading the transaction exceptions includes displaying for each transaction a status, entity, account, date, security identifier, quantity, price, and net amount.

10. The method of claim 5 wherein loading holdings corresponding to the transaction exception includes retrieving singleton holdings and near match holdings using account number, date, and currency.

11. The method of claim 5 wherein loading holdings corresponding to the transaction exception includes displaying for each holding a status, entity, account, date, security identifier, quantity, price, and market value.

12. The method of claim 1 further comprising:
receiving a selection for a transaction investigation;
retrieving transaction exceptions from the account data;
receiving a selection of a given transaction exception from the account data to examine;
loading holding exceptions from the records of the manager and the custodian associated with the given transaction exception from the account data; and
identifying a specific holding exception from the loaded holding exceptions that is being caused by the transaction exception.

13. The method of claim 1 further comprising:
receiving a selection for a holding investigation;
retrieving holding exceptions from the account data;
receiving a selection of a given holding exception to examine;
loading transaction exceptions from the records of the manager and the custodian associated with the given holding exception; and
identifying a specific transaction exception from the loaded transaction exceptions that is causing the holding exception.

14. A system for correlating, loading and presenting a plurality of reconciling data in a window display, the system comprising:
a processor; and
a memory having executable instructions stored thereon that when executed by the processor cause the processor to:
receive account data including records of holdings, transactions and cash balances of accounts managed by a manager, the account data received by the processing device importing data from a manager database and data from a custodian database over a communications network;
match the account data based on a set of rules for matching custodian and manager data, the matching including merging the imported data from the manager database with the imported data from the custodian database;
provide a holding matching process, transaction matching process, and cash matching process to identify matches and exceptions in the records of the manager and custodian for holdings, transactions and cash balances from the account data, the exceptions in the records including singletons and near matches, wherein a near match comprises a plurality of at least one of cash balances, transactions, and holdings having at least one set of matching terms and at least one set of non-matching terms;
receive a request to investigate the exceptions in the records;
generate, for the request, a plurality of windows within the master container window, a first of the plurality of windows comprises cash balances, a second of the plurality of windows comprises transactions, and a third of the plurality of windows comprises holdings;
retrieve the records of cash balances;
load the first of the plurality of windows with the records of cash balances;
monitor the first of the plurality of windows for a selection of a given cash balance from the first of the plurality of windows;
load the second of the plurality of windows with exceptions from the records of transactions associated with the given cash balance in response to the selection of the given cash balance;
monitor the second of the plurality of windows for a selection of a given transaction exception from the second of the plurality of windows; and
load the third of the plurality of windows with near match holdings from the records of cash balances associated with the given transaction exception in response to the selection of the given transaction exception, each of the near match holdings in the listing including a manager holding sub-row and a custodian holding sub-row.

15. The system of claim 14 wherein the processor is configured to:
receive a selection for a cash investigation;
retrieve cash balances from the account data;
receive a selection of a given cash balance from the account data to examine;
load transaction exceptions from the records of the manager and the custodian;
identify a specific transaction exception from the loaded transaction exceptions that is causing the cash exception;
load holdings corresponding to the specific transaction exception; and
identify one or more holding exceptions from the loaded holding exceptions that are being caused by the transaction exception.

16. The system of claim 14 wherein the processor is configured to:
receive a selection for a transaction investigation;
retrieve transaction exceptions from the account data;
receive a selection of a given transaction exception from the account data to examine;
load holding exceptions from the records of the manager and the custodian associated with the given transaction from the account data; and
identify a specific holding exception from the loaded holding exceptions that is being caused by the transaction exception.

17. The system of claim 14 wherein the processor is configured to:
receive a selection for a holding investigation;
retrieve holding exceptions from the account data;
receive a selection of a given holding exception to examine;
load transaction exceptions from the records of the manager and the custodian associated with the given holding exception; and
identify a specific transaction exception from the loaded transaction exceptions that is causing the holding exception.

18. A system for correlating, loading and presenting a plurality of reconciling data in a window display, the system comprising:
a processor; and
a memory having executable instructions stored thereon that when executed by the processor cause the processor to:
receive account data including records of holdings, transactions and cash balances of accounts managed by a manager, the account data received by the processing device importing data from a manager database and data from a custodian database over a communications network;
match the account data based on a set of one or more rules for matching custodian and manager data, the matching including merging the imported data from the manager database with the imported data from the custodian database;
identify matches and exceptions in records of the manager and custodian for holdings, transactions and cash balances from the account data, the exceptions in the records including singletons and near matches, wherein a near match comprises a plurality of at least one of cash balances, transactions, and holdings having at least one set of matching terms and at least one set of non-matching terms;
provide data for display on a user interface screen the identified matches and exceptions in a master container window;
receive a selection for a cash investigation;
generate, for the cash investigation, a plurality of windows within the master container window, a first of the plurality of windows comprises cash balances, a second of the plurality of windows comprises transactions, and a third of the plurality of windows comprises holdings;
retrieve cash balances from the account data;
load the cash balances into the first of the plurality of windows;
monitor the first of the plurality of windows for selection of the cash balances;
receive a selection of a given cash balance from the first of the plurality of windows to examine;
load transaction exceptions into the second of the plurality of windows including singleton transactions and near match transactions from the records of the manager and the custodian;
identify a specific transaction exception from the loaded transaction exceptions in the second of the plurality of windows that is causing a cash exception;
load holdings into the third of the plurality of windows corresponding to the transaction exception including singleton holdings and near match holdings, each of the near match holdings in the listing including a manager holding sub-row and a custodian holding sub-row; and
identify one or more holding exceptions from the loaded holding exceptions that are being caused by the transaction exception.

* * * * *